Patented Feb. 3, 1925.

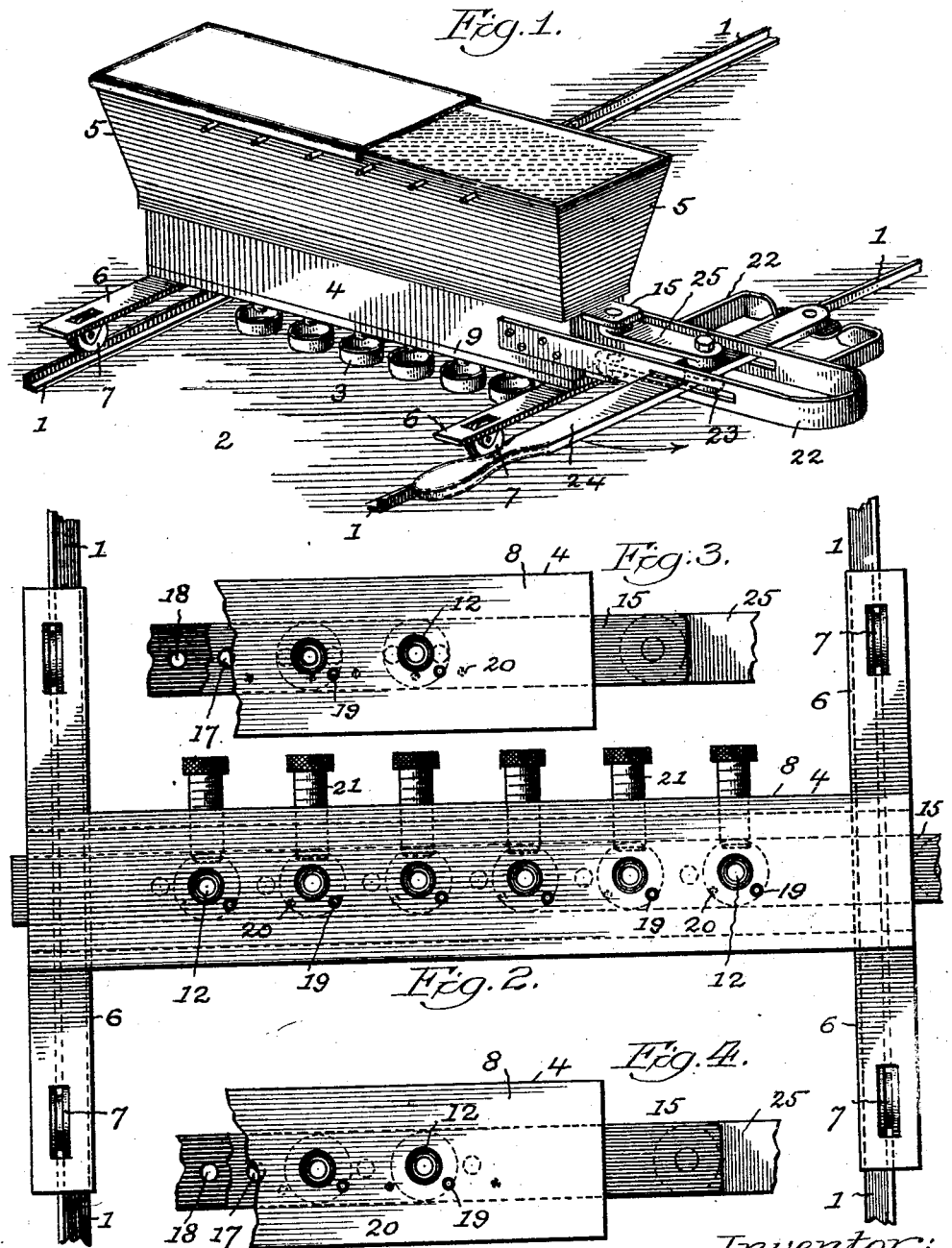

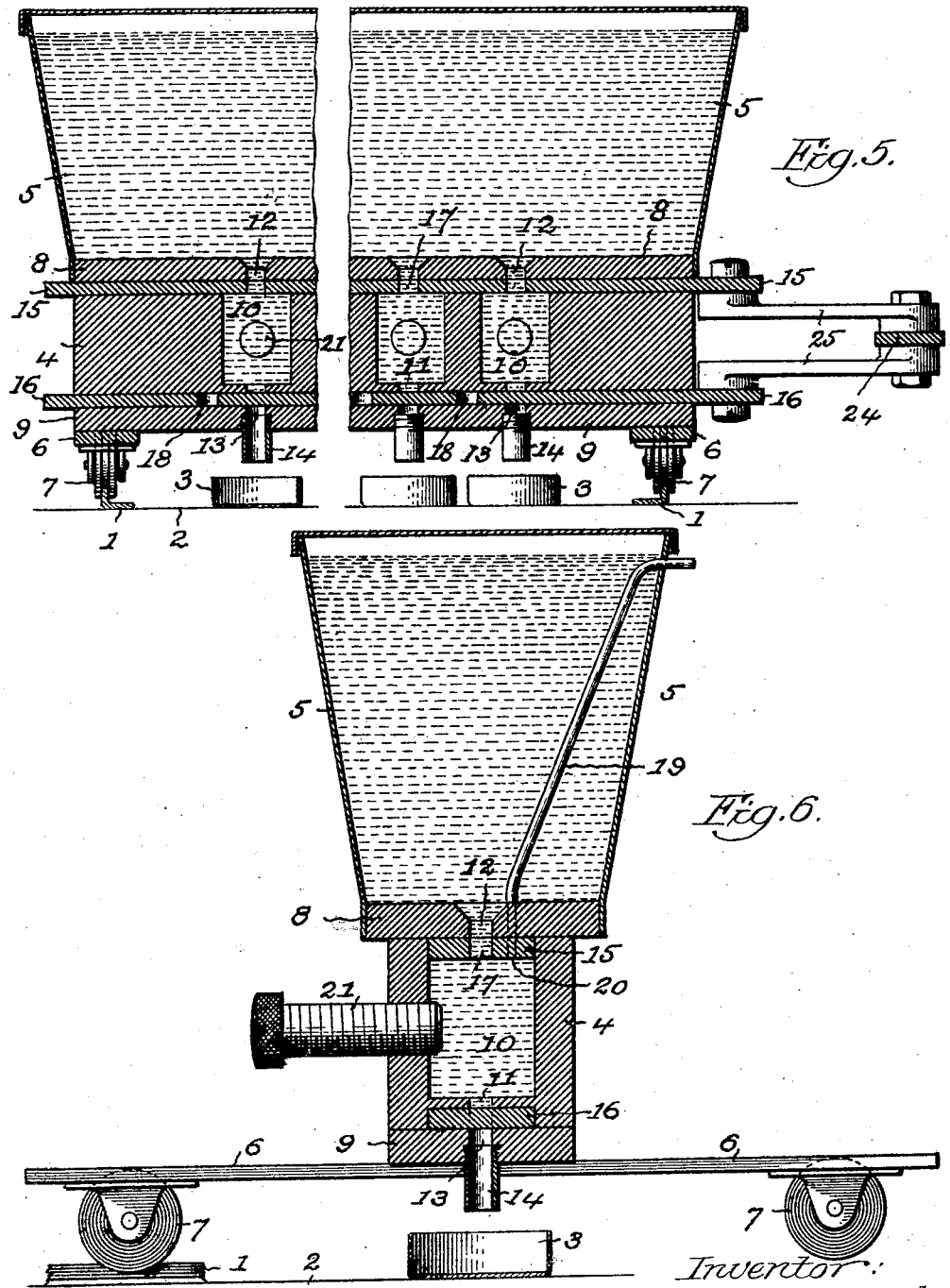

1,524,922

UNITED STATES PATENT OFFICE.

FRED FORMANECK, OF CHICAGO, ILLINOIS.

FLUID MEASURING AND CHARGING APPARATUS.

Application filed July 13, 1922. Serial No. 574,760.

*To all whom it may concern:*

Be it known that I, FRED FORMANECK, a citizen of the United States of America, residing at Chicago, in the county of Cook and State of Illinois, have invented certain new and useful Improvements in Fluid Measuring and Charging Apparatus, of which the following is a specification.

This invention relates to that class of measuring and charging mechanisms in which the material in a fluid or a molten condition is measured and discharged into containers arranged for the reception of the charges from a plurality of measuring chambers of the mechanism. The present improvement has for its object:—

To provide a structural formation and association of parts and mechanisms whereby a multiplicity of charges are measured and discharged into a row of containers at each operation of the mechanism, in an accurate and rapid manner.

In the accompanying drawings:—

Fig. 1, is a perspective view illustrating the general arrangement of parts in the present apparatus.

Fig. 2, is a plan view; the holding hopper and the top section of the measuring body being omitted.

Figs. 3, and 4, are companion fragmentary plan views of the valve mechanism in its two positions.

Fig. 5, is an enlarged detail longitudinal section.

Fig. 6, is an enlarged detail transverse section.

Like reference numerals indicate like parts in the several views.

Referring to the drawings, 1 designates track rails attached in spaced relation to a table top 2 or the like, to provide a guide for the present movable measuring and charging apparatus, with the space intervening between said rails adapted to receive rows of containers 3 which are to be filled.

4 designates the measuring central portion of the body of the apparatus which is of an elongated shape, carrying on its upper surface a holding hopper 5 for the liquid substance to be operated on, and having on its under surface truck bars 6 supported on track wheels 7 adapted to support in a shiftable manner the apparatus and accessories above the table top 2 aforesaid.

In the construction shown the body is formed with a top section 8 and a bottom section 9, with the parts fixedly connected together when assembled for use. In such construction the top and bottom faces of the central portion 4 are formed with longitudinal channels for the reception and movements of the hereinafter described slide valve members, with the top and bottom sections 8 and 9 adapted to confine said valve members in place.

10 designates a plurality of measuring chambers formed in spaced relation in the central portion 4, and in the construction shown said measuring chambers are provided with webs at the bottom of the measuring chambers 10 having central orifices 11, as shown.

12 designates a plurality of filling orifices extending through the top section 8 aforesaid, and arranged in vertical alignment with the orifices 11 in the webs of the measuring chambers.

13 designates a plurality of similarly arranged outlet orifices extending through the bottom section 9 and preferably provided with discharge nozzles or tubes 14 as shown.

15 and 16 designate upper and lower slide valve members arranged for sliding movement in the described channels in the top and bottom faces of the central portion 4, and between said central portion and the top and bottom sections 8 and 9. Said valve members are fixedly connected together to move in unison and are operated by means hereinafter described.

17 and 18 designate pluralities of orifices formed in the respective valve members 15, 16, with the orifices of one valve member having a set off relation to the orifices of the other valve member, so that in one position of said valve members, the orifices 17 in the top valve member 15 will be in register with the orifices 12 of the top section 8 to permit a down flow of liquid into the measuring chamber 10, while at the same time the orifices 18 of the bottom valve member 16 will be out of register with the outlet orifices 11 and 13 above described, to prevent any outflow of liquid from said measuring chambers. In the opposite position of said valve members, the orifices 18 of the bottom valve member are in register with the outlet orifices 11 and 13 to permit an outflow of liquid from the measuring chambers 10 into the row of containers 3 aforesaid, while at the same time the orifices 17 of the top valve member are out of register with the inlet orifices 12 aforesaid, and in consequence any flow of liquid from the hopper 5 into the measuring chambers 10 is prevented.

19 designates a plurality of upwardly extending vent pipes corresponding in number with the measuring chambers 10, and extending down through to the top section 8, with the lower end of each vent pipe adapted to register with one or the other of a pair of orifices 20 formed in the top valve member 15, and vent a measuring chamber in an inflow and in an outflow of liquid into and out of said measuring chamber. As shown in the drawings a pair of the orifices 20 are provided in connection with each measuring chamber 10 of the apparatus.

21 designates individual screw plugs passing laterally into the measuring chambers 10 for regulating or changing the capacity of the same.

22 designates a bracket formed as a fixture at one end of the central portion 4 and provided with elongated guide slots 23, acting also as a stop in limiting the throw of the operating lever now to be described.

24 designates an operating hand lever pivoted at one end to the aforesaid bracket 22 and having link connection 25 with the valve members 15, 16, to impart simultaneous movement thereto in one or the other direction.

Having thus fully described my invention what I claim as new and desire to secure by Letters Patent is:—

A fluid measuring and charging apparatus comprising a central portion constructed with channels in its top and bottom faces, and measuring chambers and webs between the channels near the bottom of the measuring chambers, having outlet orifices connecting with the bottom channel, a holding hopper, a top section having filling orifices and a bottom section having outlet orifices, and upper and lower valve-members arranged for sliding movement in the respective channels; the orifices of one valve-member having a set off relation to the orifices of the other valve-member, means for reciprocating the valve-members in unison to open and close the top and bottom outlet orifices alternately, and upwardly extending vent pipes corresponding in number to the measuring chambers and extending down through the top section with the lower end of each pipe adapted to register with one or the other of a pair of orifices formed in the top valve-member and vent a measuring chamber in an inflow and in an outflow of liquid into and out of said measuring chamber; each of the measuring chambers being provided with a pair of vent orifices.

Signed at Chicago, Illinois, this 11th day of July, A. D. 1922.

FRED FORMANECK.